United States Patent
Minamii

(10) Patent No.: US 11,926,229 B2
(45) Date of Patent: Mar. 12, 2024

(54) CHARGING DEVICE AND METHOD OF CONTROL OF THE SAME

(71) Applicant: TOYOTA JIDOSHA KABUSHIKI KAISHA, Toyota (JP)

(72) Inventor: Toshihiko Minamii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 17/466,070

(22) Filed: Sep. 3, 2021

(65) Prior Publication Data

US 2022/0072963 A1 Mar. 10, 2022

(30) Foreign Application Priority Data

Sep. 7, 2020 (JP) ................. 2020-149757

(51) Int. Cl.
| | |
|---|---|
| B60L 53/20 | (2019.01) |
| B60L 50/40 | (2019.01) |
| H02J 7/34 | (2006.01) |
| H02M 1/42 | (2007.01) |

(52) U.S. Cl.
CPC ............. B60L 53/20 (2019.02); B60L 50/40 (2019.02); H02J 7/345 (2013.01); H02M 1/4216 (2013.01); H02J 2207/50 (2020.01); H02J 2310/48 (2020.01); H02M 1/4225 (2013.01)

(58) Field of Classification Search
CPC .......... B60L 50/40; B60L 53/14; B60L 53/18; B60L 53/20; B60L 2210/30; H02J 7/02; H02J 7/345; H02J 7/00304; H02J 2207/20; H02J 2207/50; H02J 2310/48; H02M 1/36; H02M 1/4216; H02M 1/4225; Y02B 40/00; Y02T 10/70; Y02T 10/7072; Y02T 10/92; Y02T 90/14
See application file for complete search history.

(56) References Cited

U.S. PATENT DOCUMENTS

| | | | | |
|---|---|---|---|---|
| 2013/0002186 | A1* | 1/2013 | Iwahori | H02M 5/4585 318/722 |
| 2015/0364939 | A1* | 12/2015 | Talja | H02J 7/345 320/166 |
| 2017/0179745 | A1* | 6/2017 | Tritschler | B60L 53/14 |
| 2019/0168628 | A1 | 6/2019 | Pfeilschifter et al. | |
| 2019/0288539 | A1 | 9/2019 | Vela Garcia | |
| 2020/0083727 | A1* | 3/2020 | Sun | H02M 7/797 |
| 2021/0126547 | A1* | 4/2021 | Chizuwa | H02M 7/062 |
| 2021/0399628 | A1* | 12/2021 | Yeo | H02M 1/36 |

FOREIGN PATENT DOCUMENTS

| | | |
|---|---|---|
| CN | 105281440 A | 1/2016 |
| CN | 109861357 A | 6/2019 |
| CN | 110139775 A | 8/2019 |
| EP | 03499697 A1 | 6/2019 |
| JP | 2015-023663 A | 2/2015 |
| WO | 2018015263 A1 | 1/2018 |

* cited by examiner

Primary Examiner — Richard Isla
Assistant Examiner — Johali A Torres Ruiz
(74) Attorney, Agent, or Firm — Dinsmore & Shohl LLP

(57) ABSTRACT

If sensed a connector as being connected to an inlet, an ECU performs pre-charging of a capacitor. When pre-charging of the capacitor is completed, the ECU closes a relay, and controls a U-phase boost chopper circuit to boost a voltage of the capacitor. The ECU closes relays if the voltage is boosted to a second target voltage.

4 Claims, 7 Drawing Sheets

CHARGING DEVICE AND METHOD OF CONTROL OF THE SAME

CROSS REFERENCE TO RELATED APPLICATIONS

This nonprovisional application claims priority to Japanese Patent Application No. 2020-149757 filed on Sep. 7, 2020 with the Japan Patent Office, the entire content of which is hereby incorporated by reference.

BACKGROUND

Field

The present disclosure relates to a charging device, and a method of control of the same.

Description of the Background Art

WO 2018/015263 discloses a vehicle-mounted charging device that charges a vehicle-mounted battery using an electric power supplied from a three-phase power supply. The charging device includes three relays for switching the connection and disconnection between the respective phase power supplies included in the three-phase power supply.

SUMMARY

As the relays are closed and the charging device is connected to the three-phase power supply, an inrush current may flow through the charging device from the three-phase power supply. Therefore, desirably, the generation of inrush current is suppressed as appropriate.

As one of approaches, it is contemplated to provide a pre-charge resistor for each relay in the charging device, for example. In this case, however, since the pre-charge resistor is provided for each relay, an increase cost, an increased weight, etc. may result.

In order to reduce the cost and weight, it is also contemplated to provide a pre-charge resistor only for the relay that corresponds to a certain phase power supply. In this case, for example, the three relays are initially opened and pre-charging is performed via a pre-charge relay, after which the three relays are closed. However, the voltage swings are not necessarily equal between the respective phase power supplies of the three-phase power supply. Therefore, if the phase power supply provided with the pre-charge resistor has a less voltage swing than the other phase power supplies, an inrush current may flow through the charging device when the three relays are closed, even though the charging device is pre-charged by the above approach.

The present disclosure is made to solve the above problem, and an object of the present disclosure is to suppress the generation of an inrush current while achieving a reduced cost and reduced weight.

A charging device according to a certain aspect of the present disclosure charges a battery with an alternating-current power supplied from a three-phase power supply. The charging device includes: a first converter which converts the alternating-current power supplied from the three-phase power supply into a direct-current power; a second converter which converts an output voltage from the first converter into a voltage for the battery, and supplies the voltage to the battery; a first relay disposed between a first-phase power supply of the three-phase power supply and the first converter, a second relay disposed between a second-phase power supply of the three-phase power supply and the first converter, and a third relay disposed between a third-phase power supply of the three-phase power supply and the first converter; a pre-charge resistor connected in parallel to the first relay; and a controller which controls the first converter, the second converter, the first relay, the second relay, and the third relay. The first converter includes a power factor correction circuit which improves a power factor of an electric power supplied from the three-phase power supply and boosts a voltage supplied from the three-phase power supply, and a capacitor which smooths a direct-current voltage supplied from the power factor correction circuit and supplies the smoothed direct-current voltage to the second converter. Upon connection of the charging device to the three-phase power supply, the controller: opens the first relay, the second relay, and the third relay, and pre-charges the capacitor via the pre-charge resistor; after pre-charging of the capacitor is completed, closes the first relay, and controls the power factor correction circuit to boost a voltage of the capacitor to a target voltage; and after boosting the voltage of the capacitor to the target voltage, closes the second relay and the third relay.

A method of control of a charging device according to another aspect of the present disclosure is a method of control of a charging device for charging a battery with an alternating-current power supplied from a three-phase power supply. The charging device includes: a first converter which converts the alternating-current power supplied from the three-phase power supply into a direct-current power; a second converter which converts an output voltage from the first converter into a voltage for the battery, and supplies the voltage to the battery; a first relay disposed between a first-phase power supply of the three-phase power supply and the first converter, a second relay disposed between a second-phase power supply of the three-phase power supply and the first converter, and a third relay disposed between a third-phase power supply of the three-phase power supply and the first converter; and a pre-charge resistor connected in parallel to the first relay. The first converter includes: a power factor correction circuit which improves a power factor of an electric power supplied from the three-phase power supply and boosts a voltage supplied from the three-phase power supply; and a capacitor which smooths a direct-current voltage supplied from the power factor correction circuit and supplies the smoothed direct-current voltage to the second converter. The method includes: upon connection of the charging device to the three-phase power supply, opening the first relay, the second relay, and the third relay, and pre-charging the capacitor via the pre-charge resistor; after pre-charging of the capacitor is completed, closing the first relay and controlling the power factor correction circuit to boost a voltage of the capacitor to a target voltage; and after boosting the voltage of the capacitor to the target voltage, closing the second relay and the third relay.

According to the above configuration and method, the controller opens the first relay, the second relay, and the third relay, and performs pre-charging of the capacitor with the first-phase power supply via the pre-charge resistor, after which the controller closes the first relay, controls the power factor correction circuit, and boosts the voltage of the capacitor to the target voltage. As the boosting is completed, the controller closes the second relay and the third relay. In other words, by the time the second relay and the third relay are closed, the voltage of the capacitor has been boosted to the target voltage. This can suppress an inrush current from flowing through the capacitor from the second-phase power supply and/or the third-phase power supply when the second relay and the third relay are closed, even though the voltage swing of the second-phase power supply and/or the third-phase power supply is greater than the voltage swing of the first-phase power supply.

Moreover, since the pre-charge resistor may be provided to only the first relay, among the first relay, the second relay, and the third relay, a reduced cost and a reduced weight can be achieved, as compared to providing a pre-charge resistor for each of the first relay, the second relay, and the third relay.

In a certain embodiment, the target voltage is set to a value greater than or equal to a peak voltage of the three-phase power supply plus a predetermined value.

The voltage of the capacitor is boosted greater than or equal to peak voltages of the second-phase power supply and the third-phase power supply by setting the target voltage to a value greater than or equal to a value of a peak voltage of a three-phase power supply plus a predetermined margin. This can suppress an inrush current from flowing through the capacitor from the second-phase power supply and/or the third-phase power supply when the second relay and the third relay are closed.

In a certain embodiment, the power factor correction circuit includes: a first arm provided corresponding to the first-phase power supply; a second arm provided corresponding to the second-phase power supply; a third arm provided corresponding to the third-phase power supply, the first arm, the second arm, and the third arm being connected in parallel between power lines electrically connecting the first converter and the second converter; a first reactor disposed between the first relay and the first arm; a second reactor disposed between the second relay and the second arm; and a third reactor disposed between the third relay and the third arm. The first arm, the second arm, and the third arm each include two switching elements connected in series between the power lines, and two diodes connected in anti-parallel with the two switching elements, respectively. The first reactor, the second reactor, and the third reactor are connected at a point of connection between the two switching elements at the first arm, the second arm, and the third arm, respectively. The controller uses the first reactor and the first arm to boost the voltage of the capacitor to the target voltage.

According to the above configuration, the voltage of the capacitor can be boosted to the target voltage by closing the first relay and using the first reactor and the first arm.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments according to the present disclosure will be described, with reference to the accompanying drawings. Note that the same reference sign is used to refer to the same or like parts, and the description thereof will not be repeated.

<Configuration of Charging System>

Figure 1:
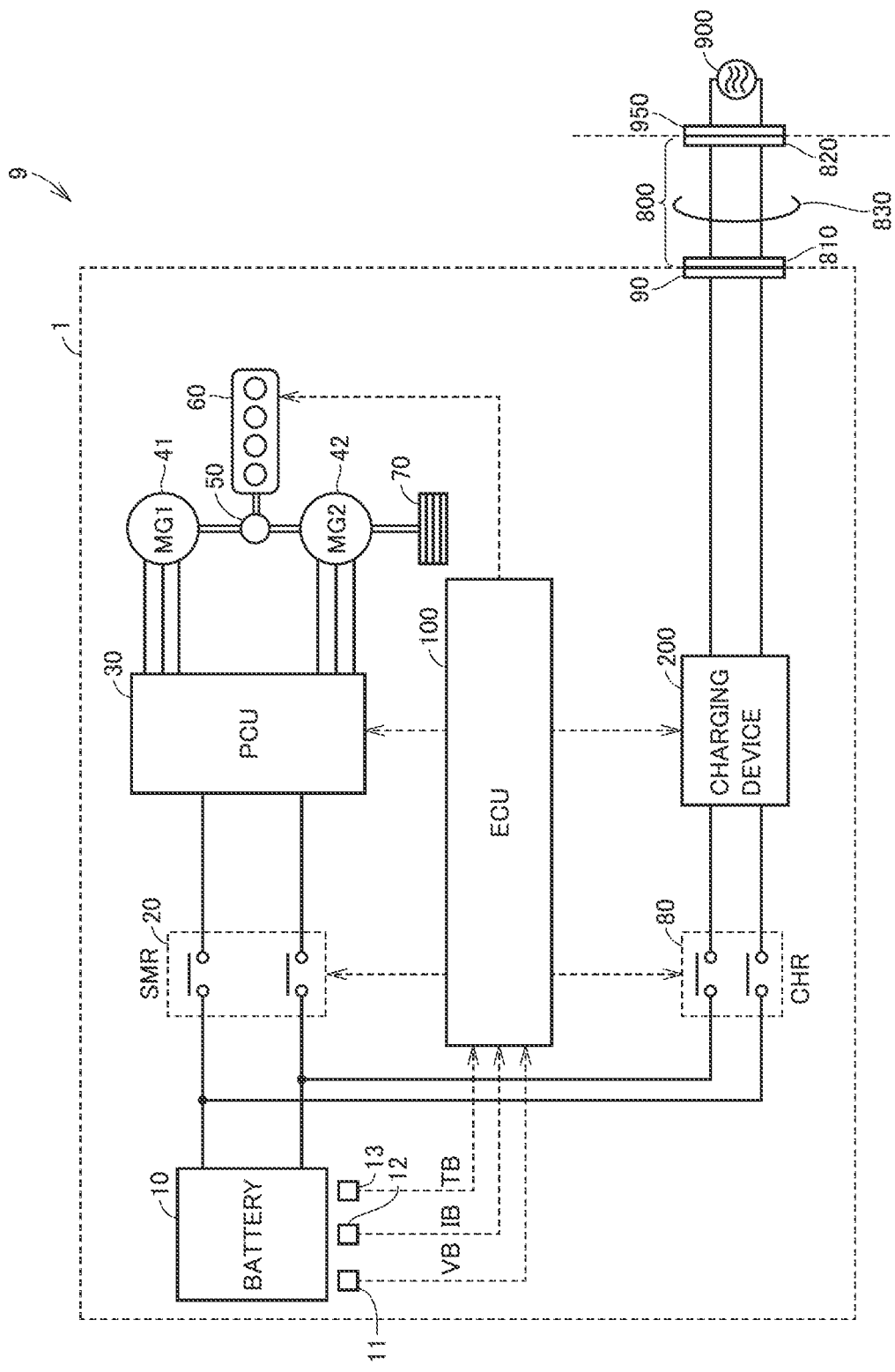
FIG. 1 is a block diagram schematically showing an overall configuration of a charging system.

FIG. 1 is a block diagram schematically showing an overall configuration of a charging system 9. Referring to FIG. 1, the charging system 9 includes a vehicle 1 and a three-phase power supply 900. The vehicle 1 and the three-phase power supply (an external power supply) 900 are connectable to each other via a charging cable 800. The charging cable 800 includes a connector 810, a plug 820 mechanically connectable to a receptacle 950 of the three-phase power supply 900, and a wire 830 connecting the connector 810 and the plug 820.

The vehicle 1 according to the present embodiment is a plug-in hybrid vehicle. However, the vehicle 1 is not limited to a plug-in hybrid vehicle, and may be any vehicle that is capable of charging a vehicle-mounted battery, using an electric power supplied external to the vehicle. For example, the vehicle 1 may be an electric vehicle or a fuel cell vehicle.

The vehicle 1 includes a battery 10, a system main relay (SMR) 20, a power control unit (PCU) 30, motor generators 41, 42, a mechanical power transmission gear 50, an engine 60, driving wheels 70, a charge relay (CHR) 80, a charging device 200, an inlet 90, and an electronic control unit (ECU) 100.

The battery (a power storage device) 10 is a secondary battery, such as a lithium-ion secondary battery or a nickel-hydrogen battery. The battery 10 is electrically connected to the PCU 30 via the SMR 20. The battery 10 supplies the PCU 30 with an electric power for generating a driving force for the vehicle 1. The battery 10 also stores electric powers generated by the motor generators 41, 42. Note that a capacitor, such as an electric double layer capacitor, may be employed, instead of the battery 10.

The battery 10 includes a voltage sensor 11, a current sensor 12, and a temperature sensor 13. The voltage sensor 11 detects a voltage VB of the battery 10. The current sensor 12 detects a current 1B input/output to/from the battery 10. The temperature sensor 13 detects a temperature TB of the battery 10. Each sensor outputs a signal indicating a result of the detection to the ECU 100. Based on these detection values, the ECU 100, for example, controls the charging and discharging of the battery and estimates the SOC of the battery 10.

The SMR 20 is electrically connected between the battery 10 and the PCU 30. In response to a control signal from the ECU 100, the SMR 20 switches supply and shutting off of an electric power between the battery 10 and the PCU 30.

The PCU 30 includes a converter and an inverter, none of which are shown. The converter boosts a direct-current (DC) voltage from the battery 10. In response to a control signal from the ECU 100, the inverter converts the DC voltage from the converter into an alternating-current (AC) voltage, and outputs the AC voltage to the motor generators 41, 42.

The motor generators 41, 42 are each an AC rotating electric machine, for example, a three-phase AC, permanentmagnet, synchronous motor. The output torque from the motor generators 41, 42 is conveyed to the driving wheels 70 via the mechanical power transmission gear 50 which includes a reduction gear and a power split device.

To start the engine 60, the motor generator 41 uses the electric power stored in the battery 10 to rotate the crankshaft of the engine 60. The motor generator 41 can also generate power using the mechanical power generated by the engine 60. The AC power generated by the motor generator 41 is converted into a DC power by the PCU and stored into the battery 10. The AC power generated by the motor generator 41 may also be supplied to the motor generator 42.

The motor generator 42 uses at least one of the electric power supplied from the battery 10 and the electric power generated by the motor generator 41 to rotate the drive shaft. The motor generator 42 can also generate power by regenerative braking. The AC power generated by the motor generator 42 is converted into a DC power by the PCU 30, and stored into the battery 10.

The engine 60 is an internal combustion engine, such as a gasoline engine, a diesel engine, etc. In response to a control signal from the ECU 100, the engine 60 generates a mechanical power for allowing the vehicle 1 to travel.

The CHR 80 is electrically connected between the battery 10 and the charging device 200. In response to a control signal from the ECU 100, the CHR 80 switches between supply and shutting off of an electric power from the charging device 200 to the battery 10.

The inlet 90 is mechanically connectable to the connector 810 of the charging cable 800. An electric power from the three-phase power supply 900 is supplied to the vehicle 1 via the charging cable 800 and the inlet 90.

The charging device 200 is electrically connected to the battery 10 via the CHR and electrically connected to the inlet 90. In response to a control signal from the ECU 100, the charging device 200 converts the AC power supplied from the three-phase power supply 900 into a DC power, and outputs the DC power to the battery 10.

The ECU 100 includes a central processing unit (CPU), a memory, input/output ports, etc. none of which are shown. Based on a signal from each sensor and each device, and maps and programs stored in the memory, the ECU 100 controls various devices so that the vehicle 1 is brought into a desired driving condition. Examples of the main control performed by the ECU 100 includes a "pre-control," which is performed when the ECU 100 senses that the connector 810 is connected to the charging cable 800 of the inlet 90. The pre-control will be described below in detail.

<Congratulations of Charging Device>

Figure 2:
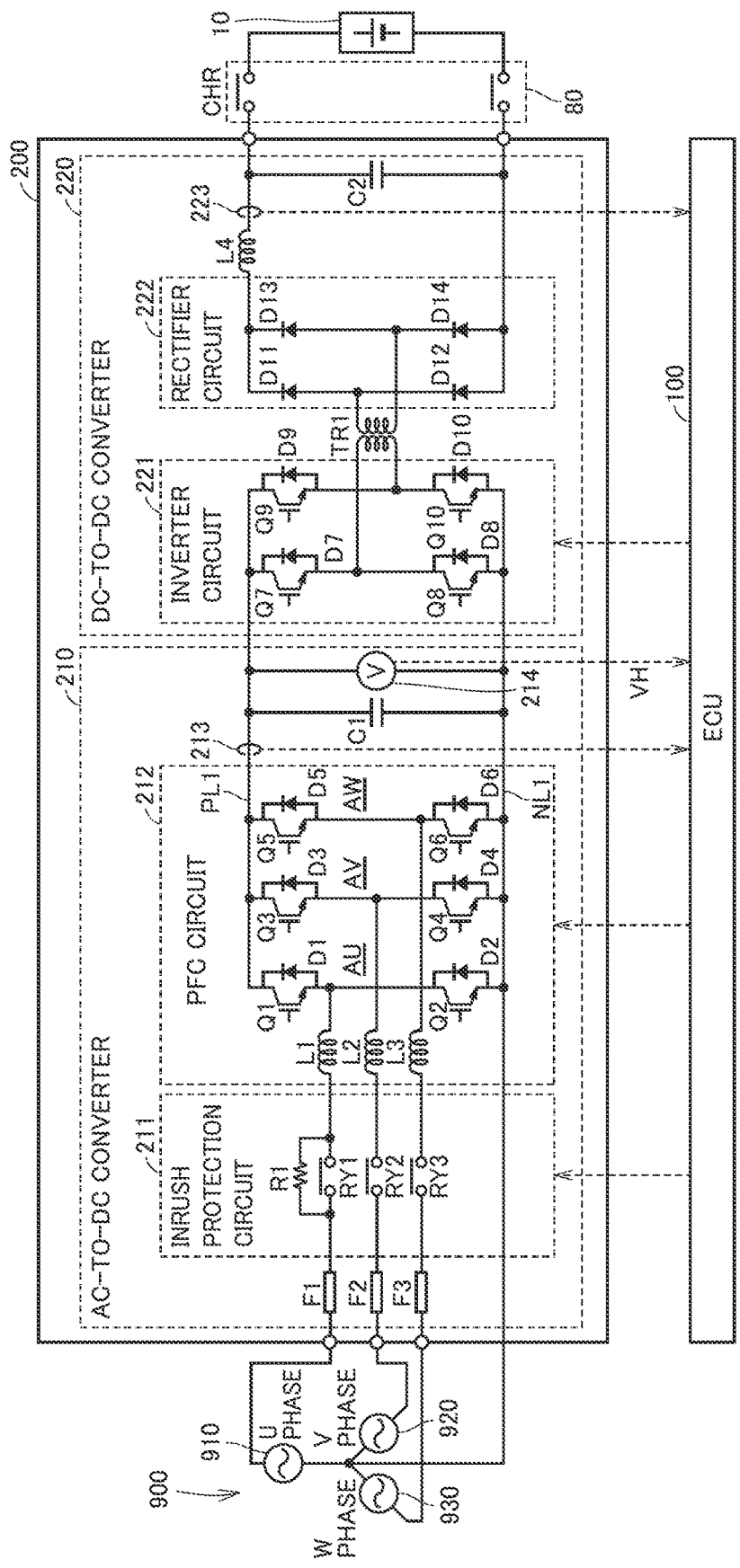
FIG. 2 is a circuit block diagram showing details of one example configuration of a charging device.

FIG. 2 is a circuit block diagram showing details of one example configuration of the charging device 200. Referring to FIG. 2, the charging device 200 includes an AC-to-DC converter 210 and a DC-to-DC converter 220.

The AC-to-DC converter 210 converts the AC power supplied from the three-phase power supply 900 into a DC power. The AC-to-DC converter 210 includes fuses F1, F2, and F3, an inrush protection circuit 211, a power factor correction (PFC) circuit 212, a current sensor 213, a capacitor C1, and a voltage sensor 214.

As a large current flows through each of the fuses F1 to F3, a built-in alloy part of the fuse blows out. The three-phase power supply 900 includes a U-phase power supply 910, a V-phase power supply 920, and a W-phase power supply 930. The fuse F1 is electrically connected between the U-phase power supply 910 and the inrush protection circuit 211. The fuse F2 is electrically connected between the V-phase power supply 920 and the inrush protection circuit 211. The fuse F3 is electrically connected between the W-phase power supply 930 and the inrush protection circuit 211.

The inrush protection circuit 211 protects the capacitor C1 from inrush current at the power-up of the charging device 200. The inrush protection circuit 211 includes relays RY1, RY2, and RY3, and a pre-charge resistor R1. The relay RY1 is electrically connected between the fuse F1 and the PFC circuit 212. The pre-charge resistor R1 is connected in parallel to the relay RY1. The relay RY2 is electrically connected between the fuse F2 and the PFC circuit 212. The relay RY3 is electrically connected between the fuse F3 and the PFC circuit 212. The relays RY1 to RY3 each switch between a closed state and an open state, in response to a control signal from the ECU 100.

At the power-up of the charging device 200 (at the time the inlet 90 is connected to the connector 810), the capacitor C1 is pre-charged, while the relays RY1 to RY3 are remained open. In other words, the capacitor C1 is pre-charged by the U-phase power supply 910 via the pre-charge resistor R1. By pre-charging the capacitor C1 via the pre-charge resistor R1, some of the current is consumed by the pre-charge resistor R1, which can reduce the current to flow into the capacitor C1. Thus, an inrush current is suppressed from flowing into the capacitor C1.

The PFC circuit 212 rectifies, boosts, and then outputs the input AC power to the DC-to-DC converter 220, while making the input current approaching sinusoidal, thereby improving the power factor of the AC power. The PFC circuit 212 includes a switching circuit for converting an AC power into a DC power, and reactors L1, L2, and L3 disposed at the input of the switching circuit. The switching circuit includes a U-phase arm AU, a V-phase arm AV, and a W-phase arm AW. The respective phase arms are connected in parallel to each other between a power line PL1 and a power line NL1. The U-phase arm AU has switching elements Q1 and Q2 connected in series. The V-phase arm AV has switching elements Q3 and Q4 connected in series. The W-phase arm AW has switching elements Q5 and Q6 connected in series. Diodes D1 to D6 are connected in anti-parallel between the collectors and the emitters of the switching elements Q1 to Q6, respectively. The switching elements Q1 to Q6 and switching elements Q7 to Q10 described below each may be, for example, an insulated gate bipolar transistor (IGBT), a metal oxide semiconductor (MOS) transistor, or a bipolar transistor, etc.

The reactors L1 to L3 are connected at a midpoint of the phase arms AU to AW, respectively. Specifically, the reactor L1 is electrically connected at a midpoint between the relay RY1 and the U-phase arm AU (the point of connection between the switching element Q1 and the switching element Q2). The reactor L2 is connected at a midpoint between the relay RY2 and the V-phase arm AV (the point of connection between the switching element Q3 and the switching element Q4). The reactor L3 is connected at a midpoint between the relay RY3 and the W-phase arm AW (the point of connection between the switching element Q5 and the switching element Q6).

The U-phase arm AU and the reactor L1 form a U-phase boost chopper circuit which can boost the voltage input from the U-phase power supply 910 to the PFC circuit 212. The V-phase arm AV and the reactor L2 form a V-phase boost chopper circuit which can boost the voltage input from the V-phase power supply 920 to the PFC circuit 212. The W-phase arm AW and the reactor L3 form a W-phase boost chopper circuit which can boost the voltage input from the W-phase power supply 930 to the PFC circuit 212.

The current sensor 213 detects an output current from the PFC circuit 212, and outputs a signal indicating a result of the detection to the ECU 100.

The capacitor C1 is connected between the power line PL1 and the power line NL1. The capacitor C1 smooths the DC voltage supplied from the PFC circuit 212, and supplies the smoothed DC voltage to the DC-to-DC converter 220.

The voltage sensor 214 detects a voltage across the capacitor C1, that is, a voltage VH between the power lines PL1 and NL1 connecting the AC-to-DC converter 210 and the DC-to-DC converter 220, and outputs a signal indicating a result of the detection to the ECU 100.

The DC-to-DC converter 220 includes an inverter circuit 221, a transformer TR1, a rectifier circuit 222, a choke coil L4, a current sensor 223, and a capacitor C2. The DC-to-DC converter 220 converts the voltage VH output from AC-to-DC converter 210 into a DC voltage VDC.

The inverter circuit 221 includes the switching elements Q7 to Q10. Based on a control signal (more specifically, the duty ratio of a pulse width modulation (PWM) signal) from the ECU 100, the switching elements Q7 to Q10 convert the DC power output from the AC-to-DC converter 210 into an AC power, and supplies the AC power to the primary winding of the transformer TR1.

The transformer TR1 converts the AC voltage from the inverter circuit 221 into an AC voltage that has a voltage value dependent on the turns ratio between the primary winding and the secondary winding.

The rectifier circuit 222 includes diodes D11, D12, D13, and D14. The diodes D11 to D14 form a diode bridge which rectifies the AC power from the secondary winding of the transformer TR1, thereby converting the AC power into a DC power.

The choke coil L4 and the capacitor C2 are connected in series between the output nodes of the rectifier circuit 222. The choke coil L4 and the capacitor C2 form an LC filter which removes a ripple component from the DC current output from the rectifier circuit 222. The ripple component is generated by the switching operations of the switching elements Q7 to Q10.

The current sensor 223 detects the current flowing through the choke coil L4, and outputs a signal indicating a result of the detection to the ECU 100.

<Pre-Control>

Here, in order to start external charging for charging the battery 10 with an electric power supplied from the three-phase power supply 900, as the connector 810 of the charging cable 800 is connected to the inlet 90, the charging device 200 is powered up by the three-phase power supply 900. As described above, at the power-up of the charging device 200, the capacitor C1 is pre-charged by the U-phase power supply 910 via the pre-charge resistor R1 in order to suppress an inrush current from flowing through the capacitor C1.

Figure 3:
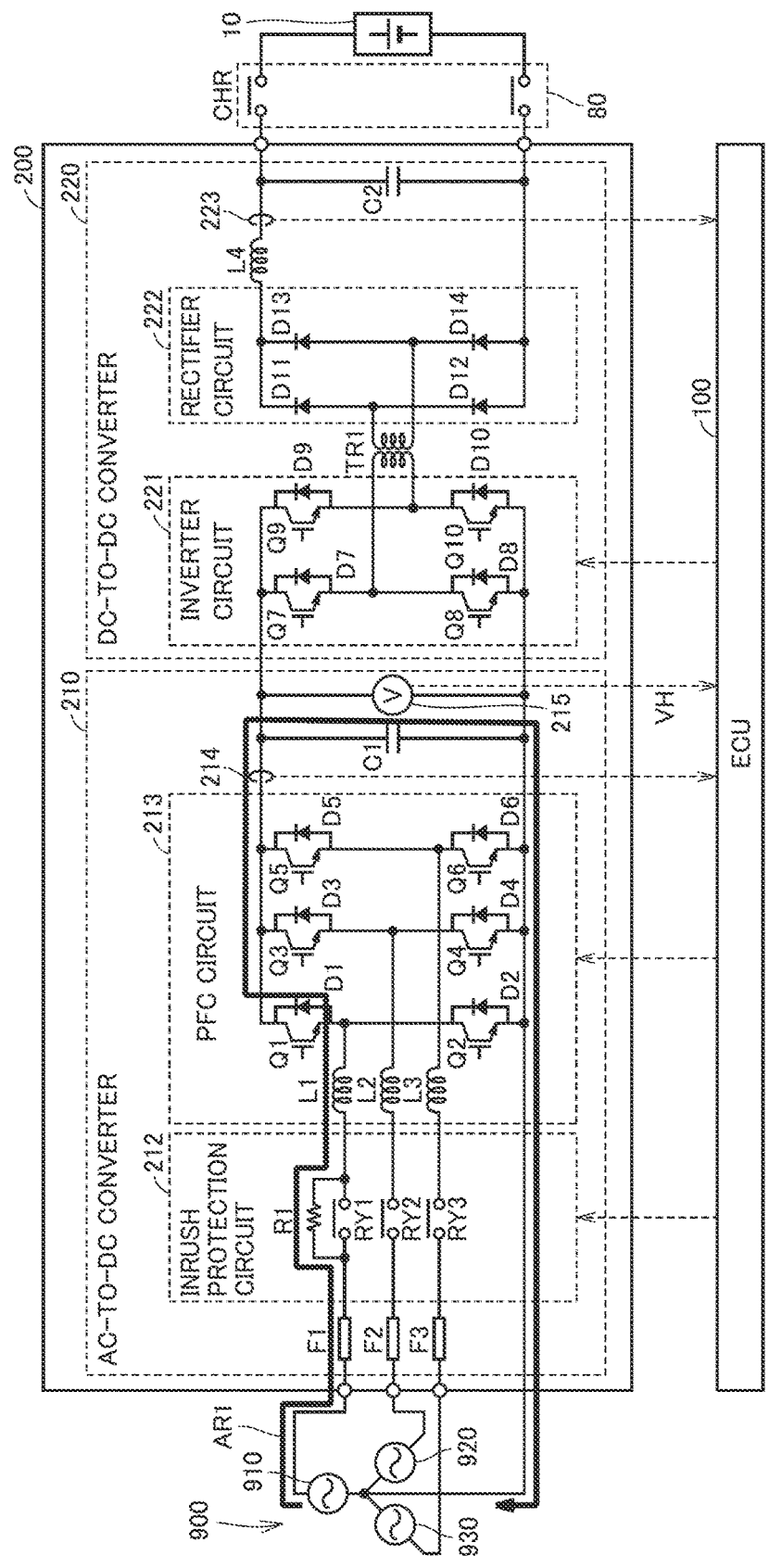
FIG. 3 is a diagram for illustrating pre-charging of a capacitor C1.

FIG. 3 is a diagram for illustrating the pre-charging of the capacitor C1. If the instantaneous value of the current from the U-phase power supply 910 is positive, the current from the U-phase power supply 910 flows through the pre-charge resistor R1 and the diode D1, and charges the capacitor C1, as indicated by an arrow AR1 of FIG. 3. Some of the current is consumed by the pre-charge resistor R1, which reduces the current flowing into the capacitor C1, thereby preventing the capacitor C1 from an inrush current.

The ECU 100 monitors the voltage VH of the capacitor C1. If the voltage VH reaches a first target voltage Vtag1, the ECU 100 determines that the pre-charging of the capacitor C1 is completed. The first target voltage Vtag1 is set to a value that is less by a predetermined voltage than a peak voltage of the U-phase power supply 910, for example. Specifically, a voltage sensor (not shown) for detecting the voltage of the U-phase power supply 910 is further provided to set the first target voltage Vtag1 based on a value detected by the voltage sensor. For example, assuming that the root mean square (RMS) value of the system voltage is 240V and a peak voltage is about 339.4V, the first target voltage Vtag1 is set to about 300V which is less by the predetermined voltage than the peak voltage. The predetermined voltage is set based on the specifications of the charging device 200, for example.

After the completion of pre-charging of the capacitor C1, for example, it is contemplated to close the relays RY1 to RY3 and charge the battery 10. However, the voltage swing may differ between the respective phases of the three-phase power supply 900. In such a case, even if the pre-charging of the capacitor C1 is completed, an inrush current may flow through the capacitor C1 when the relays RY1 to RY3 is closed. A detailed description is given below.

Figure 4:
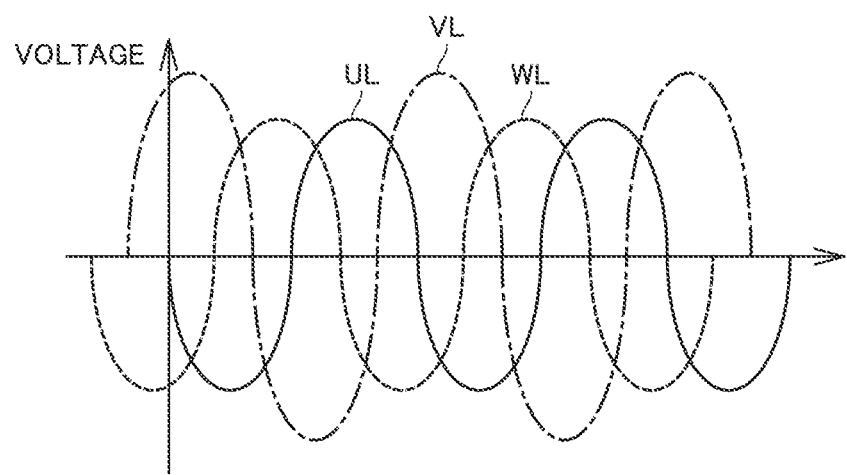
FIG. 4 is a diagram for illustrating a three-phase alternating-current (AC) voltage output from a three-phase power supply.

FIG. 4 is a diagram for illustrating a three-phase AC voltage output from the three-phase power supply 900. As shown in FIG. 4, the voltage of the three-phase power supply 900 includes: a U-phase voltage UL, which is a voltage from the U-phase power supply 910; a V-phase voltage VL, which is a voltage from the V-phase power supply 920; and a W-phase voltage WL, which is a voltage from the W-phase power supply 930. The U-phase voltage UL, the V-phase voltage VL, and the W-phase voltage WL have a phase difference of 120 degrees to each other. In FIG. 4, the solid line indicates the U-phase voltage UL, the dot-dash line indicates the V-phase voltage VL, and the dashed line indicates the W-phase voltage WL.

Here, as shown in FIG. 4, the U-phase voltage UL, the V-phase voltage VL, and the W-phase voltage WL do not necessarily have an equal voltage swing. For example, due to a difference in degree of a load applied to each phase power supply, etc., the voltage swing may differ between the U-phase voltage UL, the V-phase voltage VL, and the W-phase voltage WL. FIG. 4 illustrates a case, by way of example, where the V-phase voltage VL has a greater voltage swing than the U-phase voltage UL and the W-phase voltage WL.

Figure 5:
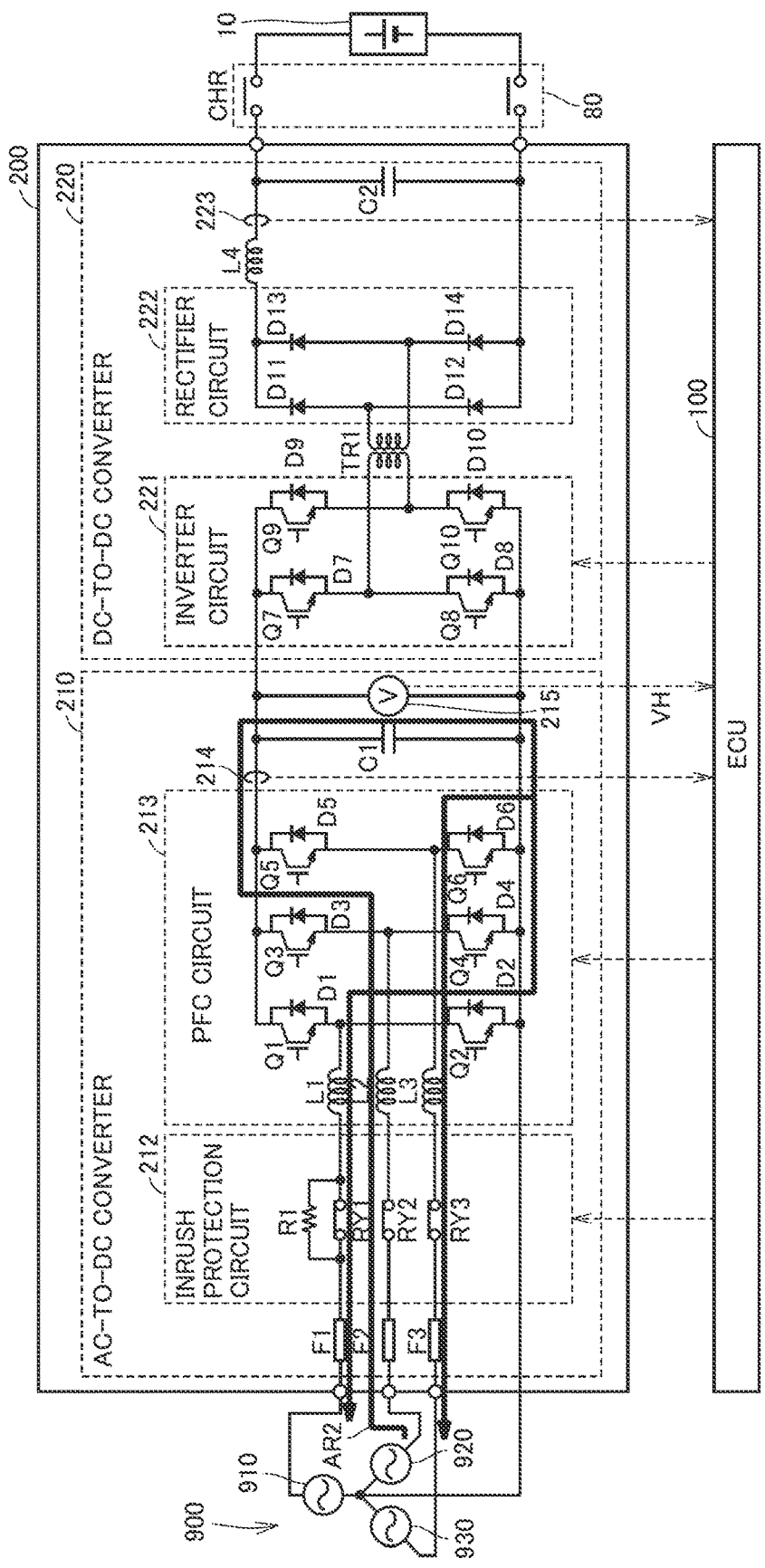
FIG. 5 is a diagram for illustrating an inrush current flowing through the capacitor C1 if relays RY1 to RY3 are closed when a V-phase voltage has a greater voltage swing than a U-phase voltage and a W-phase voltage.

FIG. 5 is a diagram for illustrating an inrush current that flows through the capacitor C1 if the relays RY1 to RY3 are closed when the V-phase voltage VL has a greater voltage swing than the U-phase voltage UL and the W-phase voltage WL.

If the relays RY1 to RY3 are closed while the pre-charging of the capacitor C1 is being completed, the V-phase voltage VL has a greater voltage swing than the U-phase voltage UL and the W-phase voltage WL. Thus, an inrush current flows through the capacitor C1 from the V-phase power supply 920, as indicated by an arrow AR2 in FIG. 5. An inrush current flowing through the capacitor C1 from the V-phase power supply 920 may cause fuses F1 to F3 to blow out, or a breaker (not shown) to trip, etc.

Thus, in the present embodiment, after pre-charging of the capacitor C1 is completed, only the relay RY1 out of the relays RY1 to RY3 is closed and the PFC circuit 212 is driven to boost the voltage VH of the capacitor C1 to a second target voltage Vtag2. The second target voltage Vtag2 is set based on the destination (e.g., Japan, Europe, North America, China, etc.) of the vehicle 1, for example. Specifically, for example, the second target voltage Vtag2 is set to a peak voltage Vpeak of a system power supply (the three-phase power supply 900) at the destination of the vehicle 1, with a predetermined error Err (e.g., about 10%) and a predetermined margin a. More specifically, for example, the second target voltage Vtag2 is represented by the following Equation (1). For example, the peak voltage Vpeak is represented by the following Equation (2).

$$Vtag2=\{Vpeak \times (1+Err)\}+a \quad (1)$$

$$Vpeak=\sqrt{2} \times V\text{ rms} \quad (2)$$

Vrms is an RMS value of the voltage of a system power supply (the three-phase power supply 900) at the destination of the vehicle 1. The predetermined error Err and the predetermined margin a can be set, as appropriate, based on the specifications of the charging system 9 and/or characteristics of a power system at the destination of the vehicle 1.

For example, assuming that the RMS value Vrms is 240V, the peak voltage Vpeak is calculated to be about 339.4V, according to Equation (2). According to Equation (1) with the predetermined error Err of 10%, the second target voltage Vtag2 is calculated to be about 373V+a. For example, the predetermined margin a is set to about 20 to 30V, and the second target voltage Vtag2 is set to a value around 400V.

The second target voltage Vtag2 is set to the peak voltage Vpeak of the three-phase power supply 900 with the predetermined error Err and the predetermined margin a, and the voltage VH of the capacitor C1 is boosted at the second target voltage Vtag2. After the voltage VH of the capacitor C1 is boosted to the second target voltage Vtag2, the relays RY2 and RY3 are closed. This can suppress an inrush current from flowing through the capacitor C1 when the relays RY1 to RY3 are closed, even though the U-phase voltage UL, the V-phase voltage VL, and the W-phase voltage WL do not have an equal voltage swing.

The voltage VH of the capacitor C1 is boosted by the U-phase boost chopper circuit. The ECU 100 controls the switching elements Q1 and Q2 so that the switching element Q1 turns off and the switching element Q2 turns on at a moment the instantaneous value of the U-phase voltage UL changes to positive. Subsequently, the ECU 100 controls the switching elements Q1 and Q2 so that the switching element Q1 turns on and the switching element Q2 turns off. This boosts the voltage VH of the capacitor C1. Note that the ECU 100 may control the switching elements Q1 and Q2 so that the switching element Q1 turns off and the switching element Q2 turns on at a moment the instantaneous value of the U-phase voltage UL changes to positive, and subsequently control the switching elements Q1 and Q2 so that the switching elements Q1 and Q2 turn off. Note that, in the present embodiment, the direction in which the current flows from the three-phase power supply 900 to the charging device 200 is the positive direction.

Figure 6:
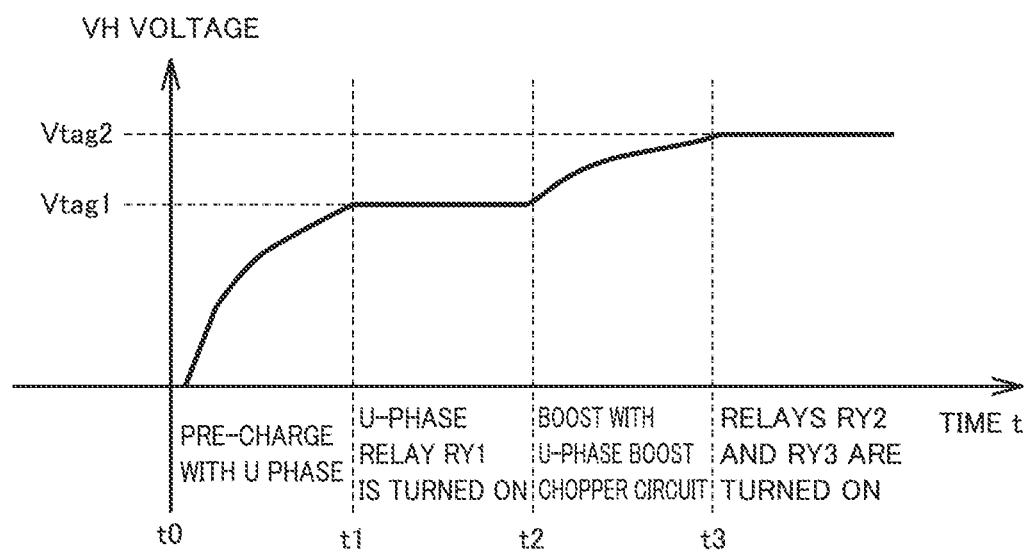
FIG. 6 is a time diagram of a pre-control.

FIG. 6 is a time diagram of the pre-control. In FIG. 6, the vertical axis indicates the voltage VH, and the horizontal axis indicates time.

Assume that, at time t0, the connector 810 of the charging cable 800 is connected to the inlet 90 in order to start external charging of the battery 10. As the ECU 100 senses the connector 810 as being connected to the inlet 90, the ECU 100 starts the pre-control. Specifically, the ECU 100 keeps the relays RY1 to RY3 open, and the switching elements Q1 and Q2 off. This causes pre-charging of the capacitor C1 with the U-phase power supply 910 via the pre-charge resistor R1 to be performed. The ECU 100 waits for the voltage VH to reach the first target voltage Vtag1, while keeping the relays RY1 to RY3 open and the switching elements Q1 and Q2 off.

At time t1, as the voltage VH reaches the first target voltage Vtag1 and the pre-charging of the capacitor C1 is completed, the ECU 100 closes the relay RY1.

At time t2, the ECU 100 controls the U-phase boost chopper circuit to boost the voltage VH from the first target voltage Vtag1 to the second target voltage Vtag2.

At time t3, as the voltage VH is boosted to the second target voltage Vtag2, the ECU 100 closes the relays RY2 and RY3. This closes all the relays RY1 to RY3. The ECU 100 then charges the battery 10.

<Processing Performed By ECU: Pre-control>

Figure 7:
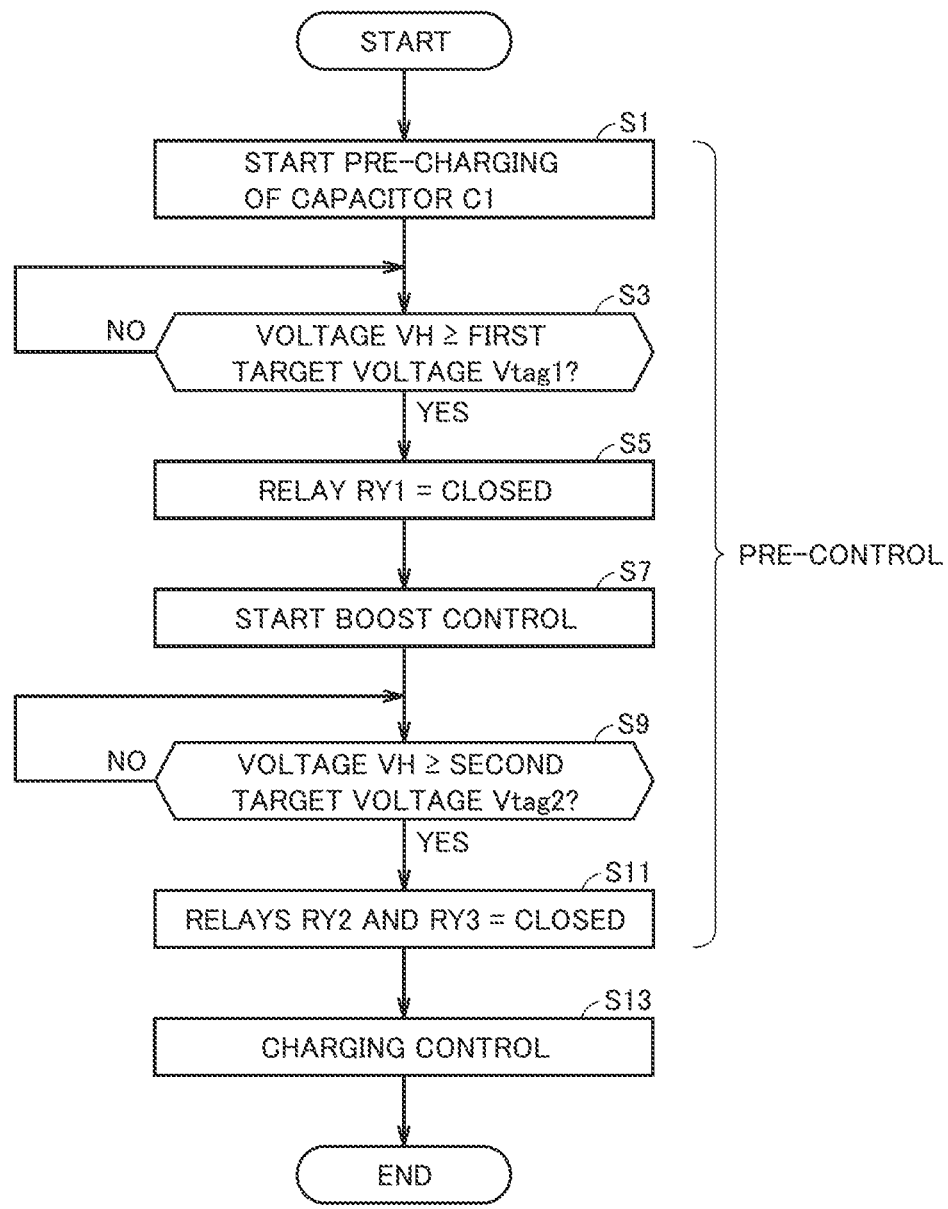
FIG. 7 is a flowchart illustrating a procedure for the pre-control.

FIG. 7 is a flowchart illustrating a procedure for the pre-control. The process illustrated in the flowchart is initiated by the ECU 100 when the ECU 100 senses the connector 810 of the charging cable 800 as being connected to the inlet 90. Each of the steps (hereinafter, each step is abbreviated as S) included in the flowchart is basically implemented by software processing by the ECU 100, but may be implemented by dedicated hardware (an electric circuit) fabricated within the ECU 100. As the ECU 100 senses the connector 810 of the charging cable 800 as being connected to the inlet 90, the ECU 100 starts the pre-control.

In S1, the ECU 100 performs pre-charging of the capacitor C1. Specifically, the ECU 100 controls the relays RY1 to RY3 to be open, and controls the switching elements Q1 and Q2 to be off. This causes the pre-charging of the capacitor C1 with the U-phase power supply 910 via the pre-charge resistor R1 to be performed.

In S3, the ECU 100 monitors the voltage across the capacitor C1, that is, the voltage VH, and determines whether the voltage VH has reached the first target voltage Vtag1. If the voltage VH has not yet reached the first target voltage Vtag1 (NO in S3), the ECU 100 performs the process of S3 again and continues to monitor the voltage VH. In contrast, if the voltage VH reaches the first target voltage Vtag1 (YES in S3), the ECU 100 passes the process to S5.

In S5, the ECU 100 closes the relay RY1. The ECU 100 then passes the process to S7.

In S7, the ECU 100 controls the U-phase boost chopper circuit and starts boosting the voltage VH.

In S9, the ECU 100 monitors the voltage VH and determines whether the voltage VH has reached the second target voltage Vtag2. If the voltage VH has not yet reached the second target voltage Vtag2 (NO in S9), the ECU 100 performs the process of S9 again and continues to monitor the voltage VH. In contrast, if the voltage VH reaches the second target voltage Vtag2 (YES in S9), the ECU 100 passes the process to S11.

In S11, the ECU 100 closes the relays RY2 and RY3. This closes all the relays RY1 to RY3. After closing the relays RY2 and RY3, the ECU 100 ends the pre-control and passes the process to S13.

In S13, the ECU 100 initiates the charging control of the battery 10 and charges the battery 10.

As described above, in the present embodiment, the ECU 100 performs the pre-control when the ECU 100 senses the connector 810 of the charging cable 800 as being connected to the inlet 90. In the pre-control, the ECU 100 opens the relays RY1 to RY3 and performs the pre-charging of the capacitor C1 with the U-phase power supply 910 via the pre-charge resistor R1. After the pre-charging of the capacitor C1 is completed, the ECU 100 closes the relay RY1, controls the U-phase boost chopper circuit, and boosts the voltage VH (the voltage across the capacitor C1) to the second target voltage Vtag2. As the boosting is completed, the ECU 100 closes the relays RY2 and RY3. This can suppress an inrush current from flowing through the capacitor C1 when the relays RY1 to RY3 are closed, even though the U-phase voltage UL, the V-phase voltage VL, and the W-phase voltage WL do not have an equal voltage swing.

Moreover, since the pre-charge resistor R1 may be provided to only one relay (the relay RY1 in the present embodiment) among the relays RY1 to RY3, a reduced cost and a reduced weight can be achieved, as compared to providing a pre-charge resistor for each of the relays RY1 to RY3.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging device for charging a battery with an alternating-current power supplied from a three-phase power supply which includes a first-phase power supply, a second-phase power supply, and a third-phase power supply, the charging device comprising:
    a first converter that converts the alternating-current power supplied from the three-phase power supply into a direct-current power;
    a second converter that converts an output voltage from the first converter into a voltage for the battery, and supplies the voltage to the battery;
    a first relay disposed between the first-phase power supply and the first converter, a second relay disposed between the second-phase power supply and the first converter, and a third relay disposed between the third-phase power supply and the first converter;
    a pre-charge resistor connected in parallel to the first relay; and
    a controller that controls the first converter, the second converter, the first relay, the second relay, and the third relay, wherein
    the first converter and the second converter are connected by a first power line and a second power line,
    the first converter includes
        a power factor correction circuit that improves a power factor of an electric power supplied from the three-phase power supply and boosts a voltage of the alternating-current power, and
        a capacitor that smooths a direct-current voltage supplied from the power factor correction circuit and supplies the smoothed direct-current voltage to the second converter, the capacitor being connected to each of the first power line and the second power line,
    the second power line is directly connected to a neutral point of the three-phase power supply,
    upon connection of the charging device to the three-phase power supply, the controller:
    opens the first relay, the second relay, and the third relay, and pre-charges the capacitor via the pre-charge resistor;
    after pre-charging of the capacitor is completed, closes the first relay, and controls the power factor correction circuit to boost a voltage of the capacitor to a target voltage; and
    after boosting the voltage of the capacitor to the target voltage, closes the second relay and the third relay.

2. The charging device according to claim 1, wherein the target voltage is set to a value greater than or equal to a peak voltage of the three-phase power supply plus a predetermined value.

3. The charging device according to claim 1, wherein the power factor correction circuit includes:
    a first arm provided corresponding to the first-phase power supply;
    a second arm provided corresponding to the second-phase power supply;
    a third arm provided corresponding to the third-phase power supply, the first arm, the second arm, and the third arm being connected in parallel between the first power line and the second power line electrically connecting the first converter and the second converter;
    a first reactor disposed between the first relay and the first arm;
    a second reactor disposed between the second relay and the second arm; and
    a third reactor disposed between the third relay and the third arm, wherein
    the first arm, the second arm, and the third arm each include two switching elements connected in series between the first power line and the second power line, and two diodes connected in anti-parallel with the two switching elements, respectively,
    the first reactor, the second reactor, and the third reactor are connected at a point of connection between the two switching elements at the first arm, the second arm, and the third arm, respectively, and
    the controller uses the first reactor and the first arm to boost the voltage of the capacitor to the target voltage.

4. A method of control of a charging device for charging a battery with an alternating-current power supplied from a three-phase power supply which includes a first-phase power supply, a second-phase power supply, and a third-phase power supply,
    the charging device including:
        a first converter that converts the alternating-current power into a direct-current power;
        a second converter that converts an output voltage from the first converter into a voltage for the battery, and supplies the voltage to the battery;
        a first relay disposed between the first-phase power supply and the first converter, a second relay disposed between the second-phase power supply and the first converter, and a third relay disposed between the third-phase power supply and the first converter; and
        a pre-charge resistor connected in parallel to the first relay, wherein
    the first converter and the second converter are connected by a first power line and a second power line,
    the first converter includes:
        a power factor correction circuit that improves a power factor of an electric power supplied from the three-phase power supply and boosts a voltage of the alternating-current power; and
        a capacitor that smooths a direct-current voltage supplied from the power factor correction circuit and supplies the smoothed direct-current voltage to the second converter, the capacitor being connected to each of the first power line and the second power line,
    the second power line is directly connected to a neutral point of the three-phase power supply, the method comprising:

upon connection of the charging device to the three-phase power supply, opening the first relay, the second relay, and the third relay, and pre-charging the capacitor via the pre-charge resistor;

after pre-charging of the capacitor is completed, closing the first relay and controlling the power factor correction circuit to boost a voltage of capacitor to a target voltage; and after boosting the voltage of the capacitor to the target voltage, closing the second relay and the third relay.

* * * * *